T. S. WOOD.
TILE MEASURING, MARKING, AND SORTING MACHINE.
APPLICATION FILED JULY 1, 1911.

1,156,337.

Patented Oct. 12, 1915.
5 SHEETS—SHEET 1.

Witnesses:

Inventor
Theodore S. Wood
By his Attorney

T. S. WOOD.
TILE MEASURING, MARKING, AND SORTING MACHINE.
APPLICATION FILED JULY 1, 1911.

1,156,337.

Patented Oct. 12, 1915.
5 SHEETS—SHEET 2.

Witnesses:
E. H. Bertholf
E. A. West.

Inventor
Theodore S. Wood
By his Attorney
Harry P. Van Wye

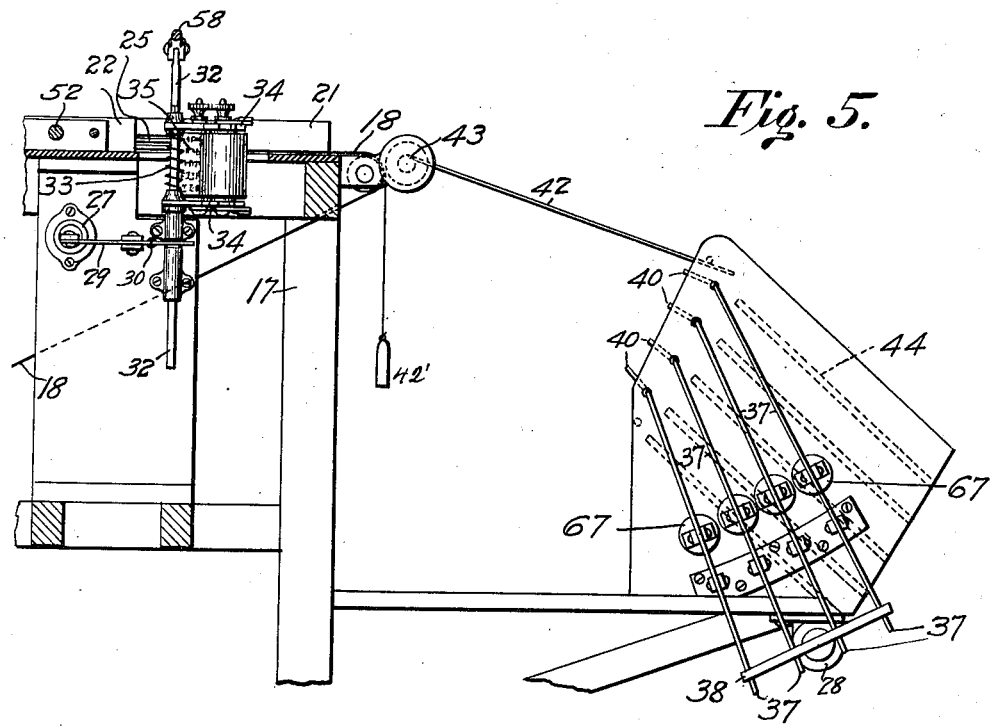
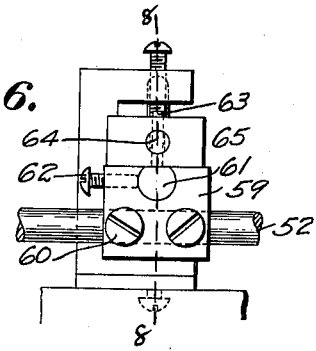
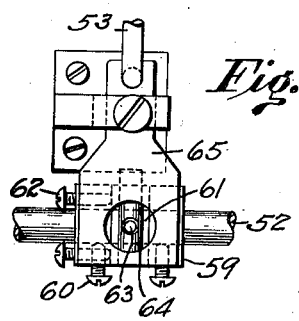
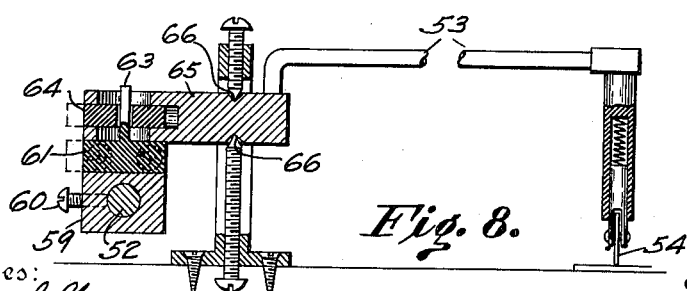

T. S. WOOD.
TILE MEASURING, MARKING, AND SORTING MACHINE.
APPLICATION FILED JULY 1, 1911.
1,156,337.
Patented Oct. 12, 1915.
5 SHEETS—SHEET 4.
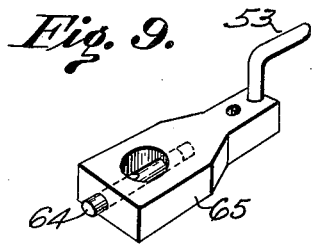
Fig. 9.
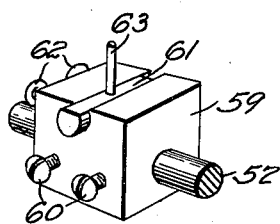
Fig. 10.
Fig. 11.
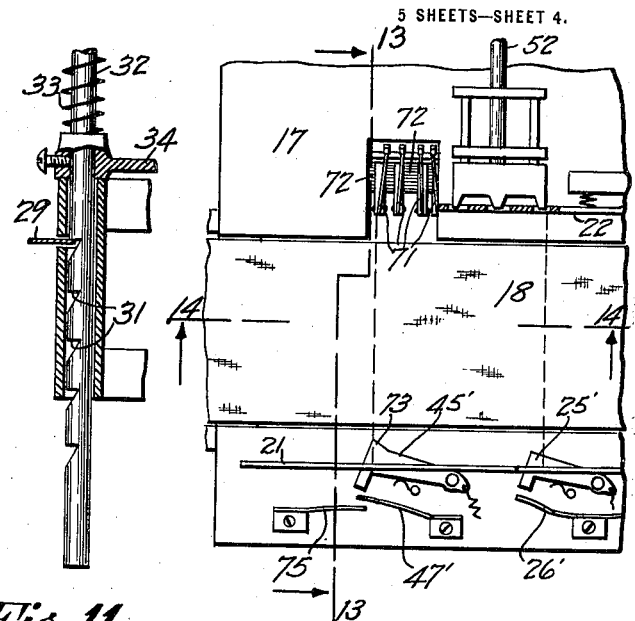
Fig. 12.
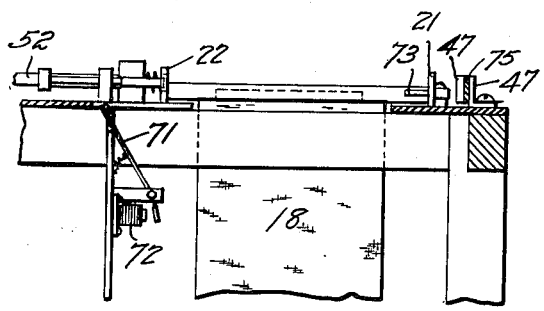
Fig. 13.
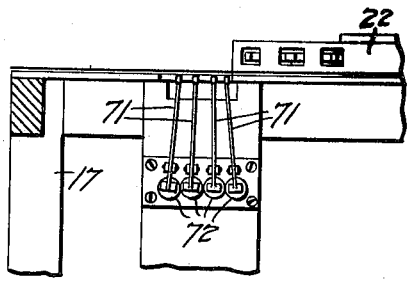
Fig. 14.
Witnesses:
Inventor
Theodore S. Wood
By his Attorney T. S. WOOD.
TILE MEASURING, MARKING, AND SORTING MACHINE.
APPLICATION FILED JULY 1, 1911.

1,156,337.

Patented Oct. 12, 1915.
5 SHEETS—SHEET 5.

Witnesses:
C. H. Berthoff
E. A. West.

Inventor
Theodore S. Wood
By his Attorney
Garry P. Van Wye

UNITED STATES PATENT OFFICE.

THEODORE S. WOOD, OF NEW YORK, N. Y.

TILE MEASURING, MARKING, AND SORTING MACHINE.

1,156,337.  Specification of Letters Patent.  Patented Oct. 12, 1915.

Application filed July 1, 1911.  Serial No. 636,430.

*To all whom it may concern:*

Be it known that I, THEODORE S. WOOD, a citizen of the United States, residing at New York, in the county and State of New York, have invented a new and useful Tile Measuring, Marking, and Sorting Machine, of which the following is a specification.

This invention relates to machines for measuring, marking and sorting tiles; and has for its object: first, to provide means to measure accurately face tile of different length; second, to mark on the end thereof the length of the same; and third, to deliver the tile of different lengths into different receptacles, or depositories.

In the manufacture of tiles for facing walls it is important to have them of substantially the same length so that in placing them on the wall the joints will run evenly. In burning, and cooling the same, however, the tile will contract with considerable variation, and to an extent that makes it impractical to place them on a wall without sorting and grading the tiles to uniform lengths. In practice this operation has usually been done by hand with unsatisfactory results in many instances owing to the fact that sufficient care is not exercised, and to the liability of the tiles getting mixed again after being sorted.

It is the object of this invention to measure, and sort the tile, and also to mark on the same the exact length so that if by accident the tile again became mixed, the operator could readily see by the markings that the tile were of different lengths.

The invention is illustrated in the accompanying drawings, in which—

Figure 1:
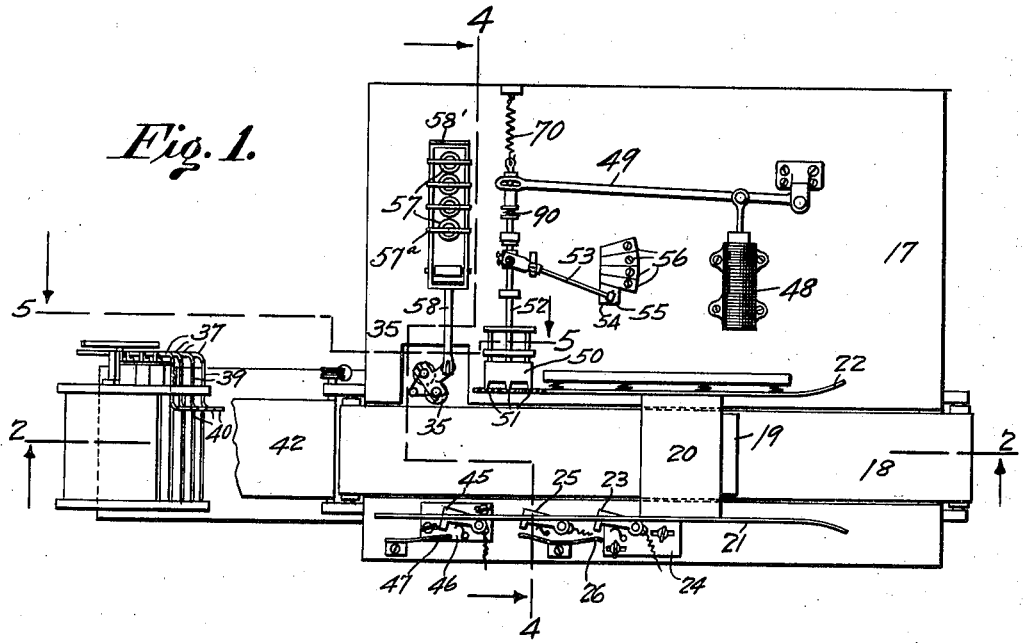
Figure 2:
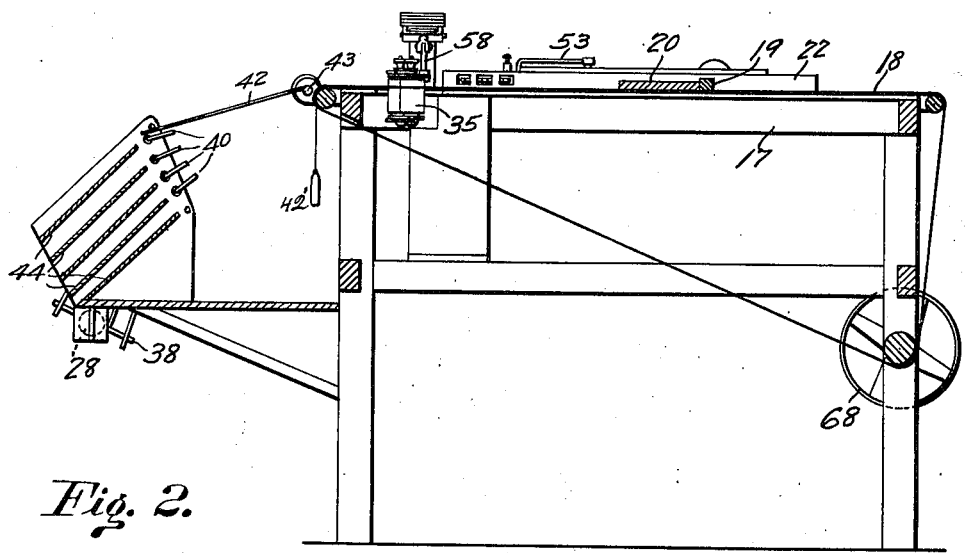
Figure 3:
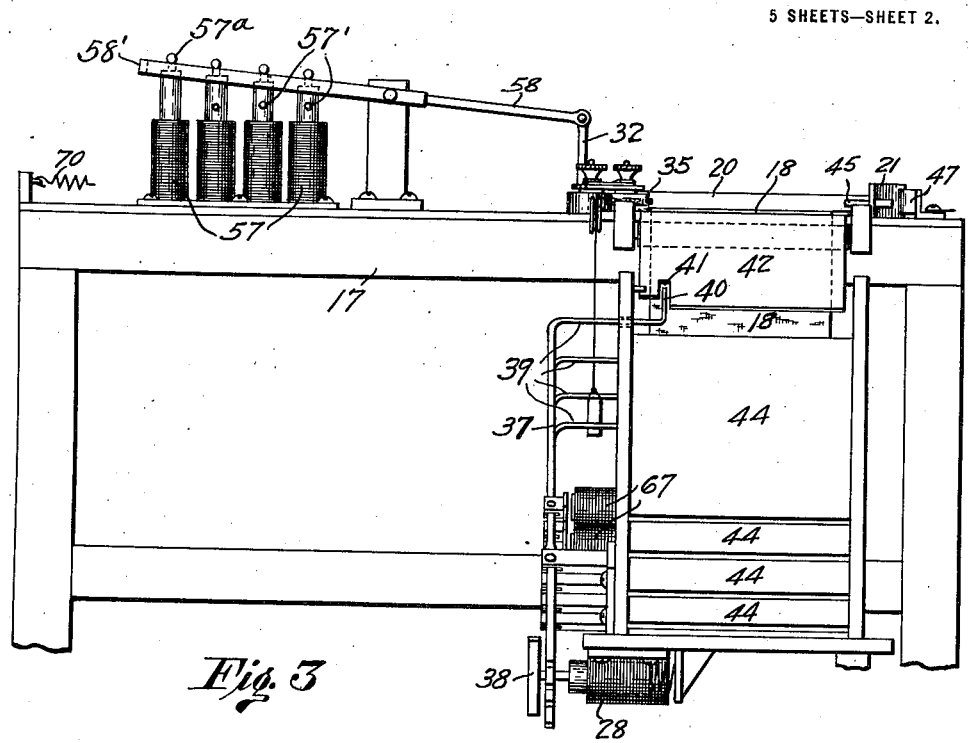
Figure 4:
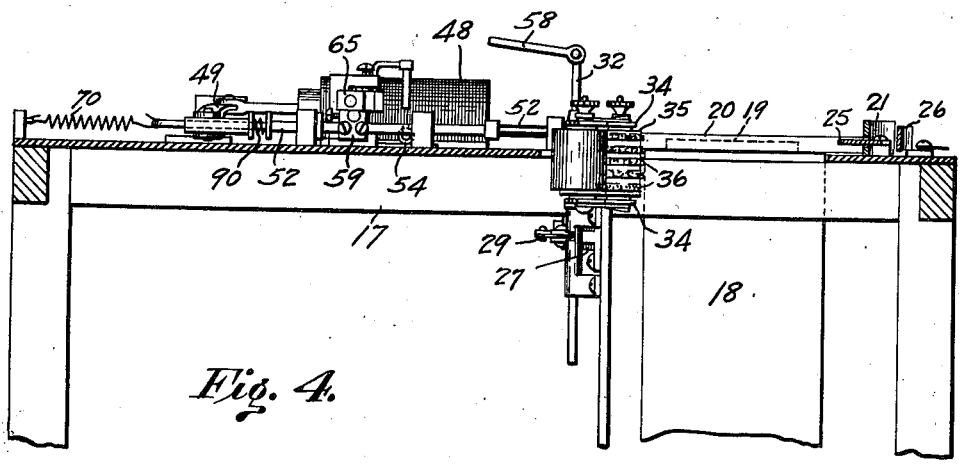
Figure 15:
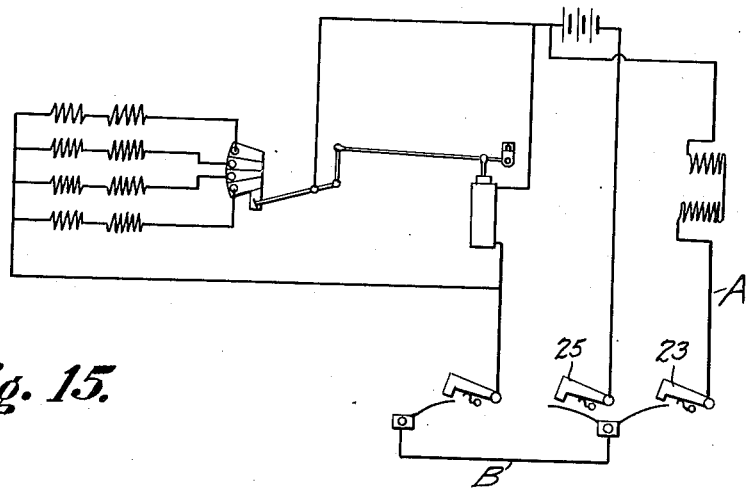
Figure 16:
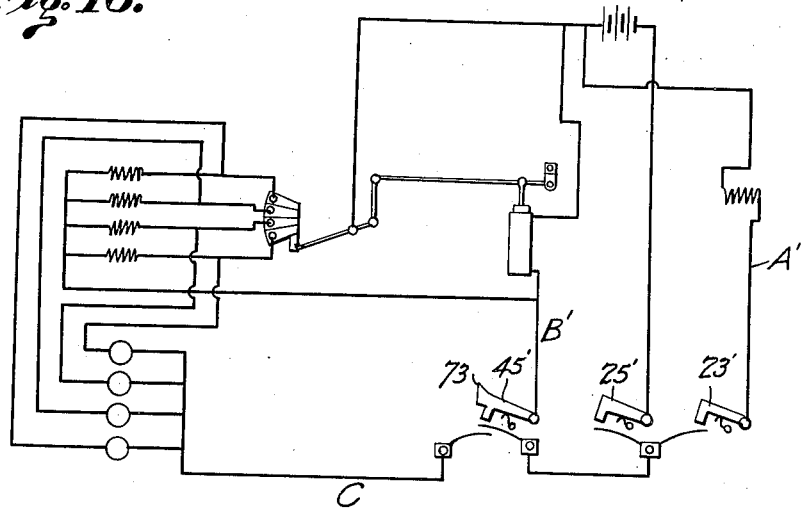

Figure 1, is a plan view of a measuring, marking, and sorting machine constructed according to my invention; a part being broken away; Fig. 2, is a sectional elevation thereof, on the line 2—2 of Fig. 1; Fig. 3, is an elevation of one end of the machine, on an enlarged scale; Fig. 4, is a sectional view on the irregular line 4—4 of Fig. 1, on an enlarged scale; Fig. 5, is an elevation, and sectional view, on an enlarged scale, taken on the irregular line 5—5, of Fig. 1; Fig. 6, is an end elevation of a detail of construction; Fig. 7, is a plan view of the same; and Fig. 8, is a sectional elevation thereof on the line 8—8 of Fig. 6, including additional features; Figs. 9, and 10, are also views of details of the same construction; Fig. 11, is a detail view, partly in section, of a part of the apparatus controlling the printing wheel; Fig. 12, is a view of a portion of the machine showing a modified form of printing apparatus; Fig. 13, is a sectional elevation, showing a part of the modified form of printing apparatus; and, Fig. 14, is a view at right angles to Fig. 13; Fig. 15, is a diagrammatic view of the electric operating circuits for the preferred form; and Fig. 16, is a similar view of the circuits used in the modified form.

In the drawings the several parts of my invention are indicated by numerals of reference.

In practice I provide a table, as 17, on which I mount an endless belt, or carrier 18, which may have cleats as 19, adapted to drive forward a tile as 20, through the measuring apparatus hereinafter described.

The measuring apparatus comprises a guide plate 21, against which the tile moves when passing through the apparatus, and a spring-controlled plate 22, adapted to hold the tile in close and even contact with the plate 21. Projecting through the plate 21, is an electrical contact finger 23, which is mounted on an adjustable block 24, so that it may be moved longitudinally relative to the contact finger 25, to insure the correct measurment of tile of different width. The finger 23, is adapted to be pressed by a passing tile against the contact spring 26, but the circuit is not closed through said contact spring until the finger 25, has been pressed by the advancing tile against the opposite end of said spring, said fingers being spaced relative to each other a distance that will insure both fingers being in contact with said spring at the same time whereby the current will flow through the circuit marked A, in Fig. 15. In this circuit is mounted the solenoid 27 (see Fig. 5), and also the solenoid 28. The first of these operates a pivoted bar 29, controlled in one direction by a spring 30, which holds it normally in engagement with one of the teeth 31, in the bar 32, and supports said bar which is controlled by the spring 33,—these parts being shown on an enlarged scale in Fig. 11.

Mounted on the bar 32, by means of a bracket 34, is a printing wheel 35, having a plurality of printing zones or belts 36, the top one of which may be normally in position to engage the end of the tile 20, in passing, to mark thereon the size of the tile. Should, however, this printing wheel have been raised, as hereinafter described, to print from one of the other zones, or belts, when the solenoid 27, is actuated the bar 29, will be withdrawn from the supporting tooth, and the printing wheel will drop to the normal position.

The solenoid 28, is adapted to actuate any one of the pivoted bars 37, that has been previously actuated as hereinafter described, through the cross bar 38, which overlaps all of said bars 37. Each of the bars 37, is provided with an angled extension 39, and a second angled extension 40, adapted to normally pass through the notch 41, in the apron 42, which is pivoted at 43, adjacent to the carrier 18, which is adapted to deliver the tile from said carrier to one of the inclined planes 44. Thus, when the bars 37, are actuated by the solenoid 28, the apron 42, will be free to descend to the lowest inclined plane 44, and deliver a tile to this plane, as will be understood. When the tile has passed to one of the planes 44, the apron 42, will be returned to the normal position by the counterweight 42'. The apron 42, is so disposed that it will support the tile while delivering the same to any of the inclined planes 44. This is a very important feature, for tile designed to be measured by this apparatus are usually very fragile, and would likely be injured or broken if dropped even a short distance.

As the carrier 18, advances the tile 20, it will be disengaged from the finger 23, when the circuit A, will be broken. As, however, the tile advances it will engage the finger 45, mounted on the adjustable block 46, so that it may be adjusted relative to the finger 25, and bring the finger 45, into contact with the contact spring 47, when the current will pass through circuit B, in Fig. 15. In this circuit is mounted the solenoid 48, adapted to actuate the pivoted bar 49, which carries inward the head 50, to engage the tile in passing, as will be understood, and fix the position of the several devices for marking and for delivering the tile into the proper receptacle. In order that the contact with the tile may be positive, I prefer to recess the head 50, to form a plurality of teeth 51, so that any dirt, or other obstruction will not interfere with the accurate setting of the devices, and a spring 90, may be used as a cushion, or shock absorber.

As the measuring head 50, advances to contact with the tile, the shaft 52, thereof, actuates the swinging bar 53, to bring the contact wheel 54, from the dead plate 55, into contact with one of the segments 56, each of which will complete a circuit through a respective solenoid 57, and three of the solenoids are provided with stops 57', in the cores thereof, adapted to limit the inward draw of the cores; and the tops of all the solenoid cores are provided with cross pieces 57ª, adapted to overlap the bars 58', which form a yoke as an extension of the lever 58, said yoke being spaced a sufficient distance apart, as shown in Fig. 1, to straddle the solenoids, and by reason of this arrangement each solenoid will raise the printing wheel 35, to a different height through the lever 58, as the bars 58', are free to move independently of the cross pieces 57ª as will be readily understood, so that the height the printing wheel is lifted will depend upon which segment 56, the wheel 54, rests when the head is in contact with the tile; and the zones, or printing belts 36, on said wheel are spaced to bring a different zone in position to print on the end of the tile. Thus, the size printed on the end of each tile will depend upon which particular segment plate 56, is in contact with the wheel 54, as will be readily understood.

As it is quite essential that the travel of the wheel 54, be accurately adjusted to the travel of the head 50, and shaft 52, I have provided the adjusting apparatus shown particularly in Figs. 6, 7, 8, 9, and 10. As shown, a block 59, is clamped upon the shaft 52, by set screws 60. In a groove in the top of this block is mounted a short shaft 61, which may be held in fixed position by set screws 62, and this shaft carries an upright pin 63, which passes loosely through an opening in a pin, or shaft 64, which is loosely mounted in a block 65, which is pivoted as shown at 66, in Fig. 8, so that the block is free to swing while in fixed swinging engagement with the shaft 52. By this connection the arm 53, and wheel 54, can be accurately set to contact with the proper segment plate.

At the same time a solenoid 57, is actuated to raise the printing wheel 35, one of the solenoids 67, will be actuated to move one of the bars 37, the bar 37, to be actuated depending upon which particular segment plate 56, the wheel 54, rests, the same as described relative to the solenoids 57. It will be understood that the solenoids 67, are in circuit B, and that the solenoids 67, correspond in number and electrical control with the respective solenoids 57. Thus the solenoid 67, actuated will correspond with the solenoid 57, actuated, and both depending on which particular segment plate 56, is in contact with the wheel 54. As one of the rods 37, is advanced by its respective solenoid 67, the angled portion thereof will be carried out of alinement with the notch 41, in the apron 42, so that when this apron is carried downward by the weight of the tile delivered thereon by the carrier, it will be stopped by the angled portion 40, of that particular rod 37, which is so positioned that the tile will be delivered to the inclined plane 44, corresponding with that particular rod, or bar 37; and the tile will pass from thence into a different receptacle from that in which it would be deposited if delivered to one of the other planes 44, as will be readily understood.

The operation of this machine will be readily understood when taken in connection with the foregoing description and accompanying drawing.

A tile having been placed on the belt, or carrier 18, it is carried forward by the rotation of the wheel 68, or in any desired manner. As the tile contacts with both of the fingers 23, and 25, the circuit is closed through A, and the printing wheel and stop bars for the swinging apron are restored to the normal position. As the tile advances, circuit A, is broken and circuit B, is closed. At this time the measuring head is brought forward by the solenoid 48, to determine the length of the tile. If normal, as shown, the tile will pass the printing wheel, receive the proper marking and will then be delivered to the lowest inclined plane 44, and from thence to its proper receptacle. Should, however, the tile be less than normal length, the measuring head will travel forward until it contacts with the same, at the same time swinging the arm 53 until the head 50, is at rest against the tile, at which time the wheel 54, will be at rest upon one of the segment plates 56. The respective solenoid 57, will thereupon be operated to raise the printing wheel to the proper height to accurately mark the length of the tile on the end thereof, so that as the tile is carried past the printing wheel it will receive the proper marking. At the same time the solenoid 57, is operated the corresponding solenoid 67, will be operated to position the proper bar 37, to stop the descent of the apron 42, at the proper point to deliver the tile to the right plane 44, for delivery into the receptacle containing tile of that length. As the tile passes the finger 25, circuit B, is broken when the measuring head 50, is returned to the normal position by the spring 70.

Tile must not be placed on the carrier so close that the first will not have time to pass from the apron 42, before the next tile engages both the fingers 23, and 25, to restore the parts to normal position; but with this limitation the tile can be passed through the machine quite rapidly, and all will be measured, accurately marked, and sorted and delivered into receptacles containing tile of the same size.

The value of this machine will be appreciated by any one familiar with the art. Face tile are usually vitrified, or glazed, and vary considerably in shrinkage. It is a difficult matter to sort these by hand; and even after being sorted there is no mark on the tile to determine its size, and confusion often results in placing the tile in proper receptacles. With this machine the tile are delivered directly to the proper receptacle; and should they get mixed afterward the size of the tile is printed on the end thereof where it can be easily seen.

In Figs. 12, 13, 14, and 16, I have shown a modified form of construction in that I use type bars to print the size on the end of the tile instead of using the printing wheel. With such an arrangement it is best to use three circuits controlled by the fingers 23′, 25′, and 45′. Type bars 71, are used, each controlled by a magnet, as 72, adapted to mark the size upon the tile, as determined by the measuring apparatus. When the measurement has been taken, the finger 45′, is further depressed by reason of the angled end 73, so that the spring contact plate 47′, is brought into contact with another contact plate 75, while the tile is still pressing the finger 25′, against the plate 26′. As the length of the tile has been determined at this time the proper bar will be actuated to accurately mark the tile, as will be readily understood, the current being passed through circuit C, to actuate the type bar.

It will thus be seen that I have provided a simple and efficient machine to determine accurately the length of tile of this kind, and also to mark and separate the same.

I do not limit myself to the exact electrical arrangement, or arrangement of circuits, nor to the operation of the parts in either direction by electricity, and the opposite by springs or weight, as considerable variation can be made without departing from the spirit of my invention.

Having thus described my invention, what I claim as new and desire to secure by Letters Patent of the United States is—

1. In an organized tile measuring machine, a carrier, or conveyer, means to operate the same, means to centralize a tile on said conveyer, means to bring a measuring apparatus into contact with said tile after being centralized on said conveyer, means independently of said conveyer-operating-means to operate said tile measuring apparatus said tile measuring apparatus being adapted to be set in motion by the passage of a tile through said centralizing means, and means in combination with said measuring means to determine and print on said tile a mark indicating the size thereof.

2. In a tile measuring apparatus, a carrier or conveyer adapted to carry a tile and means to operate the same, guide plates adapted to position a tile on said conveyer, measuring apparatus normally out of the line of travel of a tile on said conveyer, means forming a part of said machine positioned to operate said measuring apparatus to bring it into contact with a tile when positioned by said plates, and means to contact with a tile when engaged by said guide plates to set in motion said measuring means, for the purpose set forth.

3. In a tile measuring machine, a carrier or conveyer adapted to carry a tile through the machine and means to operate the same, means to position a tile on said carrier, means forming a part of said machine and positioned normally out of the line of travel of said tile and operable independently of said carrier-operating means adapted to ascertain the length of said tile, and means to mark a symbol on said tile, for the purpose set forth.

4. In an organized tile measuring machine, a carrier adapted to convey a tile through said machine and means to operate the same, means to position a tile on said carrier, a slidable head normally out of the line of travel of a tile on said carrier, means forming a part of said machine and operable independently of said carrier-operating-means to bring said head into engagement with a tile when engaged by said positioning means, and means adapted to be positioned by said head to mark a symbol on the tile, for the purpose set forth.

5. In an organized tile measuring machine, a carrier adapted to convey a tile through said machine and means to operate the same, means to position a tile on said carrier, a slidable head normally out of the line of travel of a tile on said carrier, means forming a part of said machine and operable independently of said carrier-operating-means to operate said head, and means to set said head-operating-means in motion when said tile-positioning-means is in engagement with a tile, for the purpose set forth.

6. In a tile measuring machine, a carrier adapted to convey a tile through said machine and means to operate the same, means to position a tile on said carrier, a slidable head normally out of the line of travel of a tile on said carrier, means forming a part of said machine and operable independently of said carrier-operating-means to operate said head, means to set said head-operating-means in motion when said tile-positioning-means is in engagement with a tile, and means positioned through said head to mark a symbol on a tile, for the purpose set forth.

7. In a tile measuring machine, a carrier adapted to convey a tile through said machine, means to position the tile on said carrier, a slidable head adapted to engage said tile, means adapted to operate said head when a tile is in position to be engaged by the same, and a shock absorber, or cushion between said head and operating means.

8. In a tile measuring machine, a measuring device adapted to receive a tile and means to operate the same, a marking device operatively connected with said measuring device, a plurality of solenoids adapted to position the same, means to pass a current of electricity through any of said solenoids, said measuring device being adapted to select and close the circuit through the different solenoids. for the purpose set forth.

9. In a tile measuring machine, a measuring device and means to pass a tile therethrough, electrical apparatus adapted to operate said measuring device and means to pass a current therethrough, the circuit through said electrical apparatus being normally open and means operable by the tile to close said circuit during the passage of a tile, for the purpose set forth.

10. In a tile measuring machine, a measuring device and means to pass a tile therethrough, electrical apparatus constructed and connected to operate said measuring device, and means to pass a current therethrough, the circuit through said electrical apparatus being normally open and being adapted to be closed by the passage of a tile, for the purpose set forth.

11. In a tile measuring machine, a measuring device and means to pass a tile therethrough, electrical apparatus adapted to operate said measuring device and means to pass a current therethrough, the circuit through said electrical apparatus being normally open and means operable by the tile to close said circuit during the passage of a tile, and means operatively connected with said measuring apparatus to mark a symbol on the tile after being measured, for the purpose set forth.

12. In a tile measuring machine, a measuring device and means to pass a tile therethrough, electrical apparatus adapted to operate said measuring device and means to pass a current therethrough, the circuit through said electrical apparatus being normally open and means operable by the tile to close said circuit during the passage of a tile, a marking device having a plurality of symbols, and means connected with said measuring device to select and bring the symbols to engage the tile after being measured, for the purpose set forth.

13. In a tile measuring machine, a carrier adapted to convey a tile therethrough and means to operate the same, a guide plate on one side of said carrier and a spring-controlled guide plate on the opposite side of said guide plate whereby a tile will be positioned on said carrier, a measuring device normally out of the line of travel of a tile on said carrier, and means operated by the tile when positioned on said carrier to bring said measuring device into engagement with a tile when engaged by said guide plates, for the purpose set forth.

14. In a tile measuring device, a carrier, a guide plate on one side of said carrier, a spring-controlled guide plate on the opposite side of said carrier, a measuring device having contact points passing through said first named guide plate, and means to operate said measuring device for the purpose set forth.

15. In a tile measuring machine, a carrier and means to operate the same, a guide plate on one side thereof, a spring-controlled guide plate on the opposite side thereof, an electrically-operated measuring device and means to pass a current through the same, said measuring device being adapted to measure a tile on said carrier, a marking device controlled and operated by said measuring device, and contact points positioned to engage a tile while passing said guide plates and adapted to be operated by the said tile to close the circuit through said measuring device, for the purpose set forth.

16. In a tile measuring machine, a measuring device and a marking device adapted to be operated electrically, an electric circuit adapted to operate said devices, a circuit adapted to restore said marking device to normal position having two points of contact requiring to be closed simultaneously by a passing tile to permit a current to pass, and said circuit on which said measuring and marking devices are located having two contact points requiring simultaneous closing by a passing tile to permit a current to pass, said contact points on said last named circuit being so positioned that both will not be engaged by a tile until said restoring circuit is opened, for the purpose set forth.

17. In a tile measuring machine, a measuring device, and a marking device, an electric circuit adapted to operate said devices, a circuit adapted to restore said marking device to normal position having two points of contact requiring to be closed simultaneously by a passing tile to permit a current to pass, the circuit on which said measuring and marking devices are located having two contact points requiring simultaneous closing to permit a current to pass, said two contact points on said restoring circuit being so positioned that one will be disengaged by a passing tile before the two on the other circuit are engaged simultaneously, said marking device being adapted to be reset by the operation of said measuring device after said restoring circuit is opened.

18. In a measuring machine, a sorting device comprising a plurality of inclined planes, a swinging apron adapted to support and deliver tile to any one of said planes, and a plurality of electrically-operated stops adapted to determine the plane to which delivery shall be made, for the purpose set forth.

19. A tile measuring machine comprising a measuring device, a marking device, and a sorting device, said sorting device having operative parts adapted to support a tile during its passage therethrough, means connected with said measuring device to position said marking device, and means connected with said measuring device to position said operative parts of the sorting device, for the purpose set forth.

20. A tile measuring machine comprising a carrier, an electrically operated measuring device, an electricaly-operated marking device adapted to be positioned by said measuring device, and an electrically-operated sorting device controlled by said measuring device, said sorting device having means to support the tile during the passage of the same therethrough, for the purpose set forth.

Dated June 28, 1911.

THEODORE S. WOOD.

Witnesses:
G. P. VAN WYE,
VICTOR GORDON.